United States Patent

[11] 3,601,096

| [72] | Inventor | Dwayne C. Rutherford |
| | | Vail, Iowa 51465 |
| [21] | Appl. No. | 847,372 |
| [22] | Filed | Aug. 4, 1969 |
| [45] | Patented | Aug. 24, 1971 |

[54] VENTILATING AND TEMPERATURE CONTROL SYSTEM
3 Claims, 5 Drawing Figs.

[52] U.S. Cl. .................................................. 119/15,
98/33, 119/16, 119/31, 236/6
[51] Int. Cl. ................................................. A01k 1/00
[50] Field of Search ........................................... 119/15, 28,
17, 18, 19, 16, 31; 98/33, 39, 32; 236/6

[56] References Cited
UNITED STATES PATENTS

| 1,615,964 | 2/1927 | Straight | 98/32 |
| 1,936,326 | 11/1933 | Carson, Jr. | 119/31 X |
| 1,981,166 | 11/1934 | Duttweiler | 119/16 |
| 1,995,213 | 3/1935 | Martin | 119/21 |
| 2,061,712 | 11/1936 | Martin | 119/18 |
| 2,255,806 | 9/1941 | Overson | 119/16 |
| 2,335,173 | 11/1943 | Corey | 119/21 |
| 2,354,292 | 7/1944 | Waterman | 98/33 |
| 2,969,040 | 1/1961 | Siptrott | 119/18 X |
| 3,306,257 | 2/1967 | Conover | 119/16 |
| 3,396,702 | 8/1968 | Trussell | 119/17 |

*Primary Examiner*—Aldrich F. Medbery
*Attorney*—Henderson & Strom

ABSTRACT: A ventilating and temperature control system for a closed, rectangular swine house, the swine house having a manure sump filled with water disposed centrally and longitudinally therein. Air inlets, with suitable baffles, are formed longitudinally through the sidewalls into the swine house proximate the juncture of the sidewalls and the roof and a plurality of air outlet ducts are formed through the roof in space-apart relation over the manure sump. The ducts extend downwardly of the roof and are equipped with blowers. The blowers are electrically connected into at least two separate, thermostatically controlled, electrical circuits.

Patented Aug. 24, 1971

INVENTOR
DWAYNE C. RUTHERFORD

BY
Henderson & Strom

ATTORNEYS

INVENTOR
DWAYNE C. RUTHERFORD
BY Henderson & Strom
ATTORNEYS

VENTILATING AND TEMPERATURE CONTROL SYSTEM

BACKGROUND OF THE INVENTION

This invention relates to a ventilating and temperature control system for a closed, rectangular shelter house. Odor and temperature are controlled by locating air outlet ducts, equipped with blowers, over a manure sump formed in the floor of the shelter house.

Raising of swine has, in recent years, become more scientific. Animal scientists have found that at temperatures ranging from about 60° F. to about 70° F., the conversion of feed to weight gain in swine is maximized. At lower temperatures, a larger portion of the feed is converted to animal heat rather than pork while at higher temperatures, swine refuse to eat.

In order to take advantage of the above scientific findings, and maximize the conversion of feed to pork, swine must be maintained in a building or shelter house having a controlled environment. The shelter house design, and the temperature control and ventilation systems therein, must be simple and economical if profits are to be increased. Attempts have been made to manufacture controlled environment animal houses for a variety of animals with varying degrees of success. These attempts are exemplified by Conover, U.S. Pat. No. 3,148,663; Aaberg, U.S. Pat. No. 3,401,621; Lippi, U.S. Pat. No. 3,322,054; Loomis, U.S. Pat. No. 2,708,868; and Rodick et al., U.S. Pat. No. 3,000,290.

The invention disclosed herein utilizes a simple and relatively inexpensive swine house, and a novel ventilating and temperature control system to provide a controlled environment for swine. The ventilating and temperature control system controls odor in the shelter house and maintains the air temperature in the shelter house in the optimum range without the use of complicated and expensive heating and air-conditioning equipment.

SUMMARY OF THE INVENTION

This invention relates to a ventilating and temperature control system for a closed, rectangular shelter house having a floor, sidewalls, and a roof. A manure sump, adapted to be filled with water, is formed in the floor of the shelter house and air inlet means are formed into the shelter house proximate the juncture of sidewalls and the roof. A plurality of air outlet means are formed through the roof of the shelter house over the manure sump and extend downwardly of the roof. Blower means are mounted in the air outlet means for forcing air out of the shelter house. In a preferred embodiment, the blower means are connected into and operated by at least two, separate, thermostatically controlled, electrical circuits. This shelter house, and the ventilating and temperature control system contained therein, is designed primarily for raising swine.

It is an object of this invention to provide an improved ventilating and temperature control system for a closed, rectangular shelter house.

A further object is to provide an improved ventilating and temperature control system which controls odor in a closed swine shelter.

Another object is to provide a temperature control system which maintains the temperature of the swine shelter at the optimum temperature with a minimum of expense.

A still further object is to provide an improved ventilating and temperature control system utilizing a plurality of air outlet means formed through the roof of the shelter house over the manure sump.

Still another object is to provide a system as described which utilizes a blower in each air outlet duct; the blowers being connected into and operated by at least two separate, thermostatically controlled, electrical circuits.

DESCRIPTION OF THE PREFERRED EMBODIMENT

Figure 2:
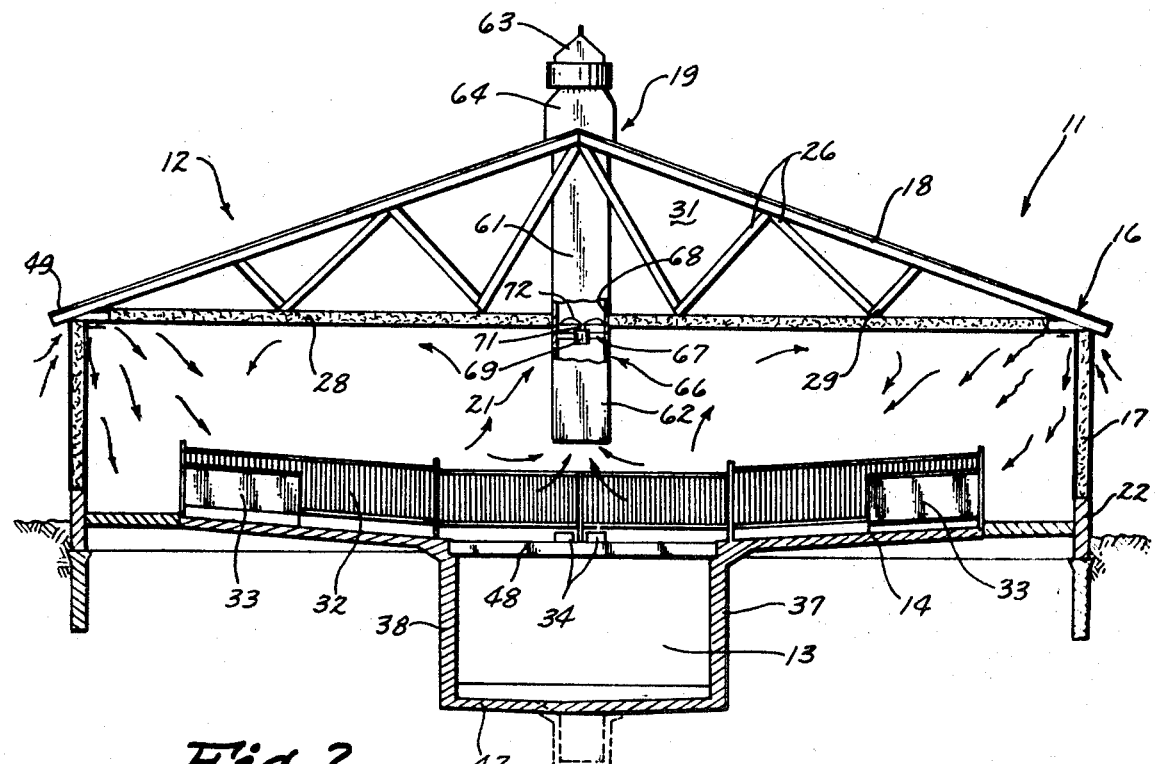
FIG. 2 is an enlarged, cross-sectional view of the ventilating and temperature control system of this invention taken along line 2—2 of FIG. 1.

Referring now to the drawings, the ventilating and temperature control system is indicated generally at 11 in FIG. 2. The ventilating and temperature control system 11 is disposed in a closed rectangular shelter house 12 and comprises a manure sump 13 formed in the floor 14 of the shelter house 12. Air inlet means 16 are formed into the shelter house 12 proximate the juncture of the sidewalls 17 and the roof 18. A plurality of air outlet means 19 are formed through the roof 18 over the manure sump 13 and extend downwardly of the roof 18. Blower means 21 are mounted in the air outlet means 19 for forcing air out of the shelter house 12.

Figure 5:
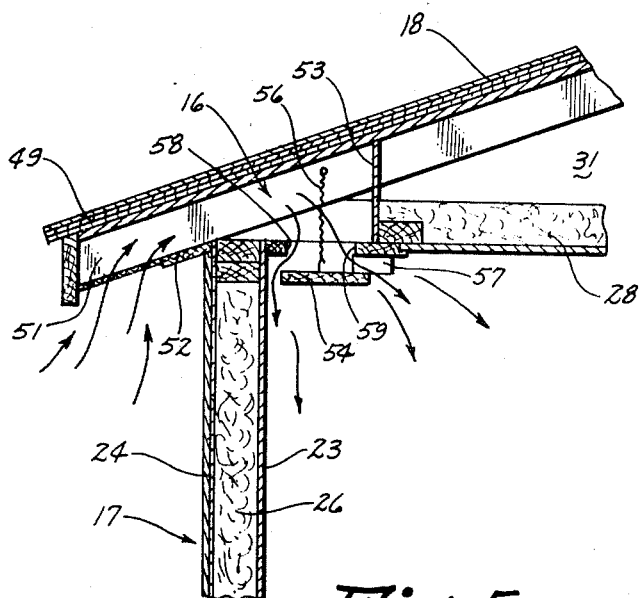
FIG. 5 is a magnified, cross-sectional view of the air inlet means.

More specifically, the shelter house 12 (FIG. 2) is a rectangular structure having a foundation 22 formed from concrete or the like. The sidewalls 17 (FIG. 5), which are preferably formed from an inside panel 23, and outside panel 24 and suitable insulating material 26, extend upwardly of the foundation 22 and support the roof 18. A plurality of braced trusses 26 further support the roof 18 structure. A false ceiling 28 (FIGS. 2 and 5) is affixed to the lower portion 29 of the trusses 26 and encloses a dead airspace 31 between the ceiling 28 and the roof 18. The floor 14 of the shelter house 12 slopes downwardly from the sidewalls 17 to the manure sump 13 which is centrally and longitudinally disposed in the shelter house 12 thereby providing drainage for the interior of the shelter house 12.

Figure 1:
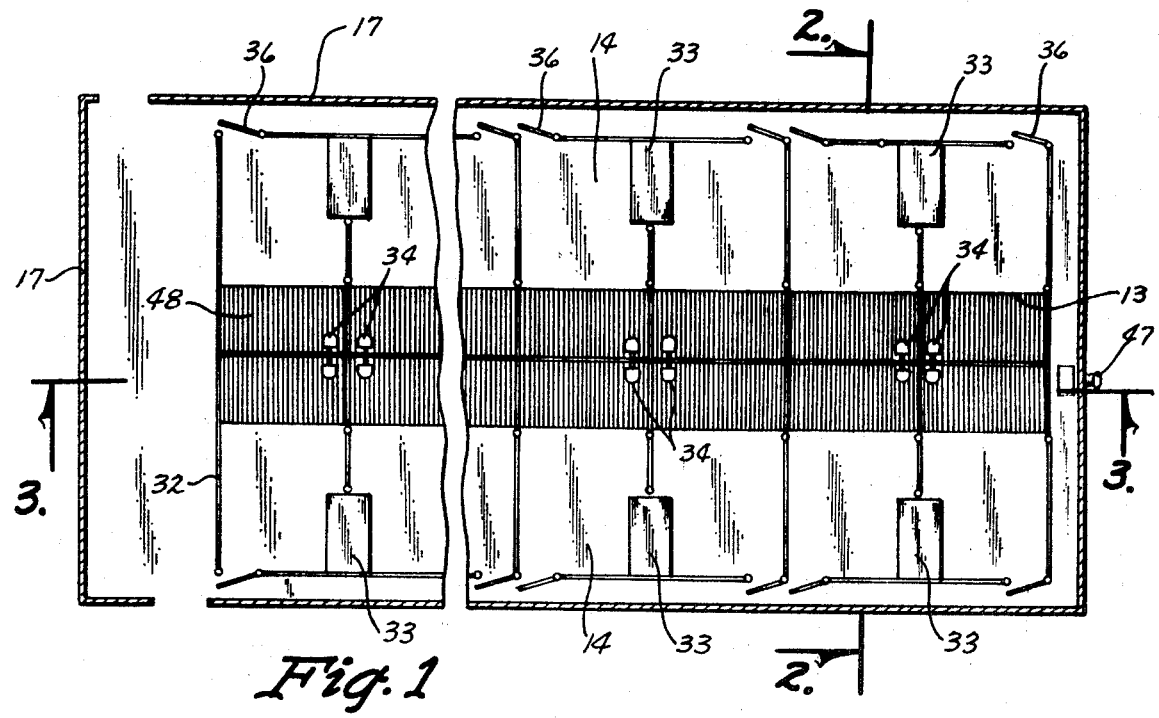
FIG. 1 is a broken, top, cross-sectional view of the shelter house utilized in this invention.

A plurality of pens 32 (FIGS. 1 and 2) are formed in the shelter house 12. Each pen 32 is equipped with a feeder 33 and a waterer 34 and each pen 32 has an individual gate 36. The feeders 33 are preferably located near the sidewalls 17 of the shelter house 12 while the waterers 34 are located over the manure sump 13. The waterers 34 are so disposed as swine generally defecate while drinking. The animals are thereby trained to defecate over the manure sump 13 and the feeding area is kept clean and relatively odor free.

Figure 3:
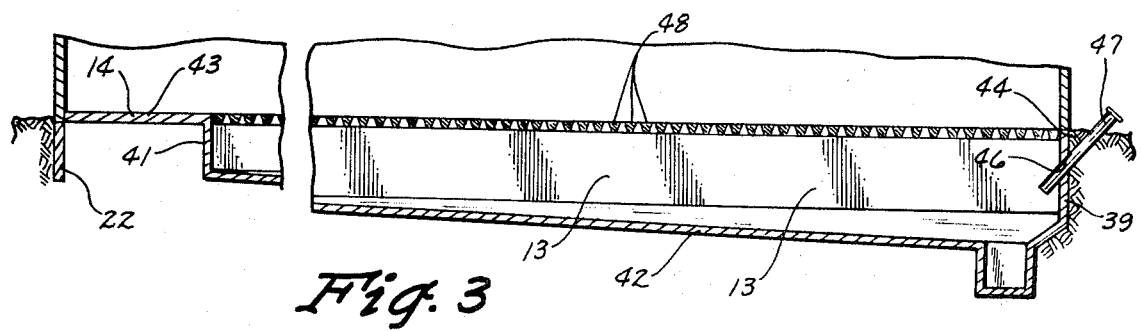
FIG. 3 is an enlarged, cross-sectional view of the manure sump taken along line 3—3 of FIG. 1.

The manure sump 13 is preferably formed centrally and longitudinally of the shelter house 13 (FIGS. 2 and 3). The manure sump 13 has two longitudinal sidewalls 37 and 38 and two lateral endwalls 39 and 41. The floor 42 of the manure sump slopes downwardly from one end 43 to the other end 44 of the shelter house 12. The manure sump 13 is adapted to be filled with water which controls odor in the shelter house 12, aids in controlling the temperature within the shelter house 12, and aids in cleaning the manure sump 13.

The manure sump 13 (FIG. 3) extends for substantially the entire length of the shelter house 12 and its width is generally about one-fourth that of the width of the shelter house 12. The manure sump 13 is provided with a cleaning opening 46 and a pipe 47. A sump pump (not shown) can then readily be utilized to clean the manure sump 13.

Water is maintained in the manure sump 13 at sufficient depth to cover the floor 42 and the feces contained therein. The evaporation of water in the manure sump 13 materially aids in temperature control in the shelter house 12 and, therefore, the water must be replenished from time to time, especially in hot weather.

The manure sump 13 (FIG. 3) is covered by a removable, slatted floor 48 which rests on the sidewalls 29 and 31 of the manure sump 13 and is level with the floor 14 of the shelter house 12. The swine feces, which are generally of liquid consistency, can then pass through the slatted floor 48 and into the manure sump 13.

Air inlet means 16 (FIGS. 2 and 5) are formed under the eaves 49 of the roof 18. Apertures 51 are formed through the underside 52 of the eaves 49 of the roof 18 and enter the interior of the shelter house 12 downwardly through the ceiling 28 of the shelter house 12. A longitudinal beam 53 prevents air entering through aperture 51 from flowing through the dead airspace 31. Apertures 51 are formed into the shelter house 12 along substantially the entire length thereof.

Baffle boards 54 (FIG. 5) are adjustably suspended below the apertures 51 by springs 56. Blocks 57 can be inserted between the baffle boards 54 and the ceiling 28 to maintain the desired opening. The baffle boards 54 are extended outwardly of the ceiling 28 during warm weather to facilitate airflow through the shelter house 12 and cooling of the animals. During colder weather, the baffle boards 54 are maintained in close proximity to the apertures 51 to reduce airflow and retain heat within the shelter house 12. The baffle boards 54 also prevent snow, dirt, and other foreign materials from entering the shelter house 12.

The baffle boards 54 are of sufficient width to overlap both longitudinal sides 58 and 59 of the aperture 51 through the ceiling 28. The baffle boards 54 divide the airflow and force air down the sidewall 17 and obliquely over the pens 32 thus facilitating better circulation through the shelter house 12 (See FIG. 5). In very severe weather, the baffle boards 54 can be closed completely over the apertures 51 to preserve heat and prevent foreign materials from accumulating in the shelter house 12. Care must be taken, however, to provide some ventilation for the swine housed in the shelter house 12.

A plurality of air outlet means 19 (FIG. 2) are formed through the roof 18 and the ceiling 28 of the shelter house 12 over the manure sump 13. Each air outlet means 19 comprises an open duct 61 formed through the roof 18 and ceiling 28, the duct 61 extending downwardly of the ceiling 28 to a height slightly higher than the height of the animals being kept in the shelter house 12.

The bottom portions 62 (FIG. 2) of the ducts 61 are open and face the floor 42 of the manure sump 13. The ducts 61 are preferably vertically disposed. A crown 63 is secured over the uppermost portion 64 of the duct 61 to prevent snow, dirt or other extraneous matter from entering the shelter house 12. The ducts 61 are disposed directly over the manure sump 13 and are in spaced apart and side-by-side relation. Preferably, the ducts 61 are above 2 feet square and spaced on about 6-foot centers to attain maximum control over the air temperature in the shelter house 12.

Mounting means 66 (FIG. 2), shown as lateral brackets 67, are mounted on the inner surfaces 68 of the ducts 61. Blower means 21, consisting of an electric motor 69 having a shaft 71 and a fan blade 72 mounted on the shaft 71 are mounted on the brackets 67. When the motors 69 are rotating the fan blades 72, a convection current is induced through the shelter house 12. Air enters the shelter house 12 though the air inlet apertures 51 and is forced downwardly along the sidewalls 17 and obliquely over the pens 32 by the baffle boards 54.

The incoming air passes over the animals and the manure sump 13. The water in the manure sump 13 is kept at a relatively constant temperature by the earth on the outside of the sidewalls 37 and 38 of the manure sump 13. As the air passes over the manure sump 13, it is cooled in very warm weather.

The heat transfer process involves a latent heat transfer due to change of state of a small portion of the water from a liquid to a vapor and a sensible heat transfer due to the difference in temperature of the water and the air. By increasing the width of the apertures 51 and by increasing the number of blower means 21 in operation, this heat transfer can be accelerated and, concomitantly, the air passing through the shelter house 12 can be cooled. Although much of the air is expelled through the air outlet ducts 61, sufficient amounts of the air are recirculated into the incoming airstream to significantly cool that incoming air and the animals in the shelter house 12.

In colder weather, the air inlet apertures 51 are restricted and the blower means 21 are run only sporadically, primarily to provide ventilation and to control odor. A sensible heat transfer takes place between the water and the incoming air which, to some extent, warms the air. Heat generated by the animals, in addition to this sensible heat transfer, is sufficient to control the temperature in the shelter house 12 and maintain it in the optimum range.

In all types of weather, the blower means 21 are run sporadically to remove odors from the shelter house. Generally, the blower means are operated more in warmer weather and less in cooler weather.

Figure 4:
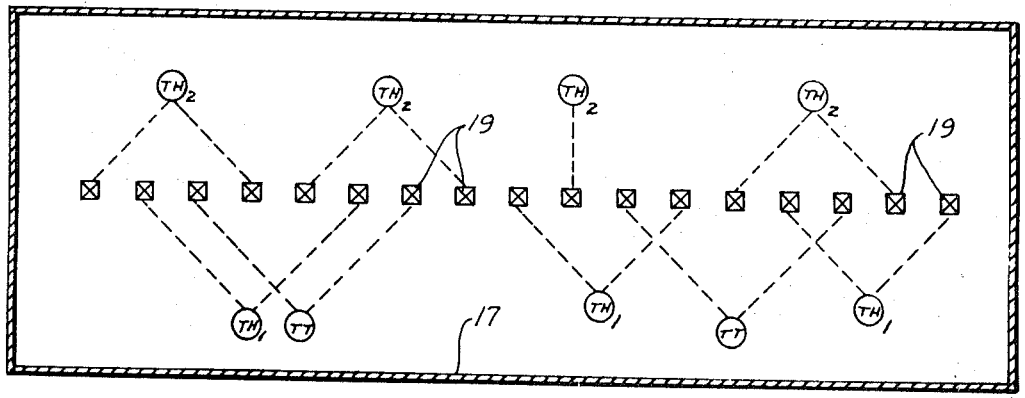
FIG. 4 is a schematic drawing illustrating the location of the air outlet ducts in relation to the manure sump, and illustrating the electrical circuits which operate the blowers.

As shown in FIG. 4, three separate electrical circuits, TT, $TH_1$, and $TH_2$ are utilized in this ventilating and temperature control system 11. At least two circuits are required to attain the degree of temperature control required in this invention and three separate circuits have been found to be preferable. The addition of more circuits increases the degree of temperature control attainable.

The circuit, TT, utilizes both a timer and a thermostat. The timer (not shown) completes the circuit TT and starts the blower means 21 at predetermined intervals to control odor in the shelter house 12 and provide sufficient air for purposes of ventilation. It has been found, in the specific design shown, that the four blower means 21 in the TT circuit can control odor and maintain sufficient ventilation if they are run for 30 seconds in each 10-minute period. If the temperature inside the shelter house 12 exceeds the temperature at which the thermostat in the TT circuit is set, for example 68° F., the four indicated blower means 21 will run continuously until the air temperature inside the shelter house 12 is reduced to less than the temperature at which the thermostat is set.

The circuit, $TH_1$, utilizes a thermostat only. The thermostat in the $TH_1$ circuit is set a few degrees higher than the thermostat in the TT circuit, for example 71° F. If the air temperature in the shelter house exceeds 71° F., all of the blower means in the $TH_1$ circuit will run continuously until the air temperature falls below 71° F. Therefore, the six blower means 21 in the $TH_1$ circuit and the four blower means in the TT circuit would run continuously at temperatures in excess of 71° F. in the shelter house 12.

The $TH_2$ circuit also utilizes only a thermostat, the thermostat being set several degrees higher than the thermostat in the $TH_1$ circuit, for example 73° F. If the air temperature inside the shelter house exceeds 73° F., all the blower means 21 will be in operation. It has been found that this system 11 will maintain the shelter house 12 at a relatively constant temperature below about 75° F. on days when the outside air temperature exceeds 90° F. On cold winter days, the timer operated blower means 21 provide sufficient ventilation and control odor without a significant temperature drop in the shelter house 12.

Although a preferred embodiment has been described, it is to be remembered that various modifications may be made without departing from the invention as defined in the appended claims.

I claim:

1. A ventilating and temperature control system for a closed shelter house having a floor, sidewalls, and a roof, the ventilating and temperature control system comprising:
   a manure sump formed in the floor of the shelter house and adapted to be filled with water;
   air inlet means formed into the shelter house proximate the juncture of the sidewalls and the roof;
   baffle means proximate said air inlet means;
   a plurality of air outlet means formed through the roof of the shelter house over said manure sump, said air outlet means extending downwardly of the roof;
   blower means mounted in each air outlet means for forcing air out of the shelter house, said blower means being electrically operated and connected in at least two electrical circuits, a first part of said blower means being controlled by first electrical circuit means to operate on a periodic basis regardless of the temperature in the shelter house, and a second part of said blower means being controlled thermostatically.

2. The ventilating and temperature control system of claim 1 wherein:

said shelter house is rectangular;

said manure sump is formed centrally and longitudinally of the shelter house and extends for substantially the entire length thereof;

said air inlet means extend substantially the entire length of the shelter house along both sides and include openings on the interior of the shelter house facing the floor; and said baffle means includes means suspended below and proximate said openings and having a width greater than the width of said openings and being adapted to adjustably distribute incoming air partially down along the interior walls of the shelter house and partially away from the interior sidewalls.

3. The ventilating and temperature control system of claim 2 wherein:

said manure sump is formed by two longitudinal, spaced-apart sidewalls extending downwardly of the floor of the shelter house; two lateral, spaced-apart endwalls extending downwardly of the floor of the shelter house and abutting the longitudinal sidewalls; and a sump floor sloping to one end of said shelter house; and wherein said sump is covered by a slatted framework level with the floor of the shelter house.